(No Model.)
H. C. SWAN.
VEHICLE SPRING.
No. 572,733.  Patented Dec. 8, 1896.
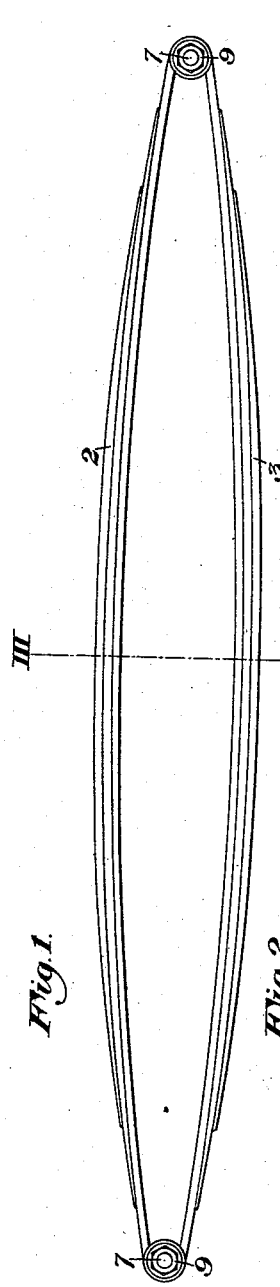
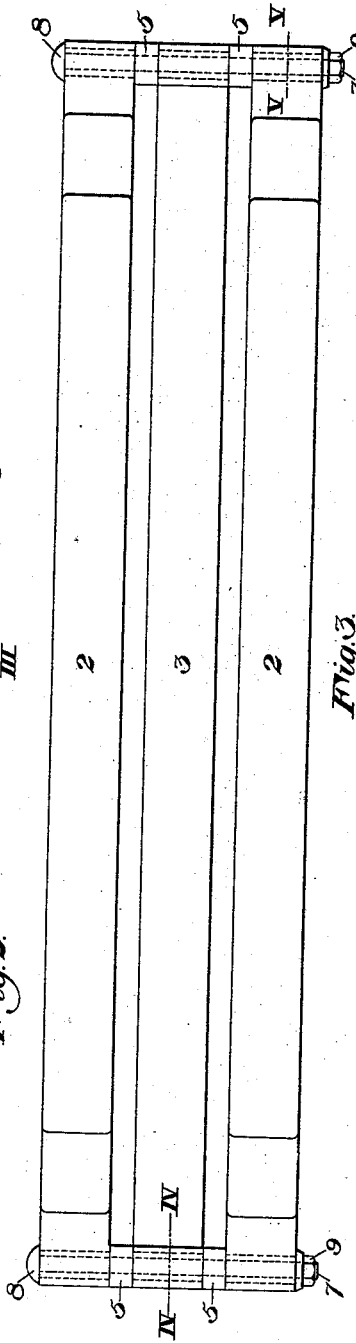
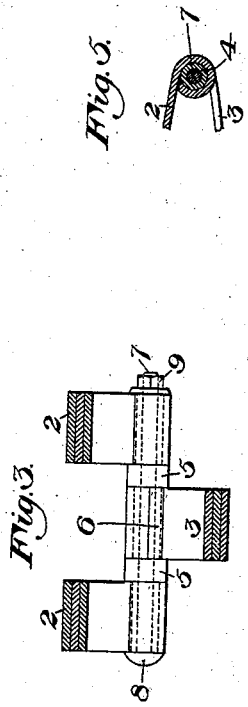
WITNESSES
INVENTOR
Henry C. Swan
by Bakewell & Bakewell
his Attorneys

UNITED STATES PATENT OFFICE.

HENRY C. SWAN, OF OSHKOSH, WISCONSIN.

VEHICLE-SPRING.

SPECIFICATION forming part of Letters Patent No. 572,733, dated December 8, 1896.

Application filed June 9, 1896. Serial No. 594,862. (No model.)

*To all whom it may concern:*

Be it known that I, HENRY C. SWAN, of Oshkosh, in the county of Winnebago and State of Wisconsin, have invented a new and useful Improvement in Springs for Vehicles, of which the following is a full, clear, and exact description, reference being had to the accompanying drawings, forming part of this specification, in which—

Figure 1 is a side elevation of a complete spring constructed in accordance with my invention. Fig. 2 is a plan view thereof. Fig. 3 is a vertical cross-section on the line III III of Fig. 1. Fig. 4 is a vertical section on the line IV IV of Fig. 2, and Fig. 5 is a vertical section on the line V V of Fig. 2.

My invention is designed to provide a cheap, efficient, and durable shackle for coupling the ends of a vehicle-spring, the purpose being to couple together a half elliptic spring with two other half elliptic springs bowed in the opposite direction, so that they shall be as neat and as little bulky as possible, and shall not have the clumsy appearance of couplings heretofore known.

In the drawings, 2 2 are the top main leaves of the spring, and 3 is the bottom leaf. To couple these leaves together at the ends, I employ tubular pins 4 4, each having formed integrally on it collars 5 5, adapted to receive between them the eye at the end of the leaf 3. To hold said eye so that it may not rotate on the pin, I form on the pin between the collars a rib 6, the eye being bent around the pin so that its end shall engage the rib. Looseness of the joint is thus prevented. The other leaf-springs 2 2 are slipped upon the tubular pin on the outer sides of the collars 5 5, so as to abut against the same, and are confined thereon by a through-bolt 7, the head 8 of which bears against the outer end of the eye of one spring 2, and the nut 9 of which bears against the outer end of the other eye. The bearings of the bolt within these eyes being round allow the springs to be depressed by rotating at the ends.

I am aware that various devices have been employed to couple springs by interlocking tubes and by semicircular tubes having lugs through which a bolt may pass. The latter device is clumsy and requires an unnecessary amount of weight to accomplish the purpose, while the interlocking devices bring an unnatural and unwarranted strain upon the bolt, which, being unsupported, makes the coupling defective and short-lived.

I claim—

1. A spring-coupling having outer spring-sections 2, 2 and an intermediate spring-section 3 curved in the opposite direction from the outer spring-sections, a pin passing through the eyes of said sections, and integral collars on said pin between the eye of the middle sections and the eyes of the outer sections.

2. A spring-coupling having outer spring-sections 2, 2 and an intermediate spring-section 3 curved in the opposite direction from the outer spring-sections, a pin passing through the eyes of said sections, and integral collars on said pin between the eye of the middle sections and the eyes of the outer sections, said pin being tubular and having a through-bolt.

3. A spring-coupling wherein at least three spring-sections are mounted upon a pin having a rib for engaging the eye of the middle spring and collars for confining and separating it from the other sections.

In testimony whereof I have hereunto set my hand.

HENRY C. SWAN.

Witnesses:
JOHN H. BAEHR,
DANZIE W. GARRINGTON.